No. 897,839. PATENTED SEPT. 1, 1908.
D. J. MAHONEY.
GAGE FOR SEED PLANTERS AND CLAMPING MEANS THEREFOR.
APPLICATION FILED DEC. 31, 1907.

WITNESSES
Samuel E. Wade
Geo. E. Brock

INVENTOR
DENIS J. MAHONEY.
BY Munn & Co.
ATTORNEYS

UNITED STATES PATENT OFFICE.

DENIS J. MAHONEY, OF WITOKA, MINNESOTA.

GAGE FOR SEED-PLANTERS AND CLAMPING MEANS THEREFOR.

No. 897,839.　　　Specification of Letters Patent.　　　Patented Sept. 1, 1908.

Application filed December 31, 1907. Serial No. 408,808.

*To all whom it may concern:*

Be it known that I, DENIS J. MAHONEY, a citizen of the United States, and a resident of Witoka, in the county of Winona and State of Minnesota, have made a new and useful Improvement in Gages for Seed-Planters and Clamping Means Therefor, of which the following is a specification.

My invention relates to improvements in gages for seed planters and has for its object to provide a gage and means for attaching same to regulate the depth to which the runner or furrow opener shall be permitted to enter the soil and also regulate the depth at which the seed shall be deposited.

It has for a further object to produce a device which shall be cheap, simple and which can be readily applied to or removed from any of the wheel planters commonly in use without changing the same.

Figure 1:
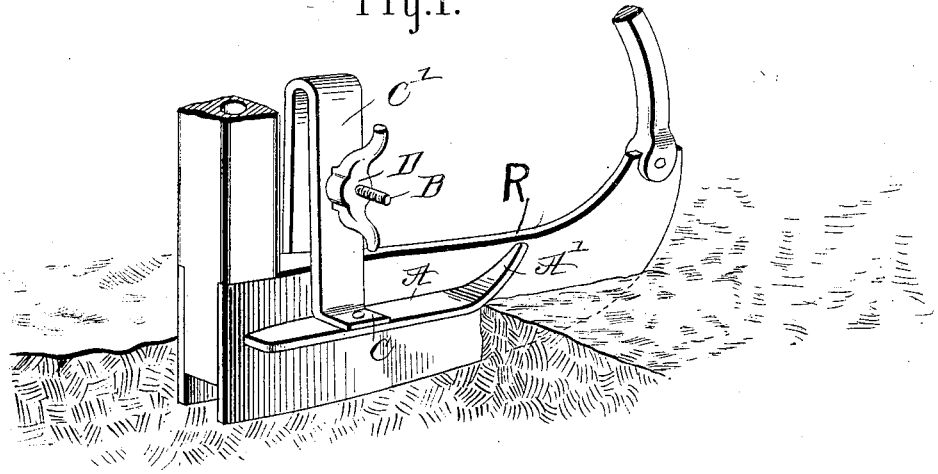
Figure 2:
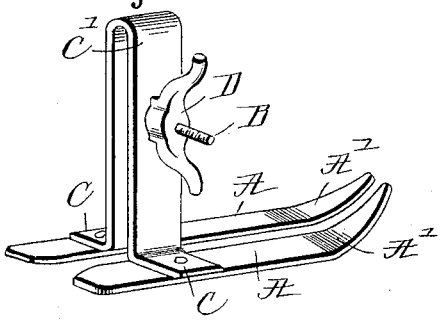
Figure 3:
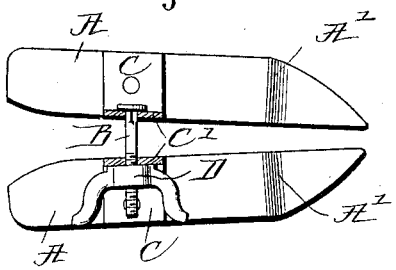

With these objects in view my invention consists in certain novel features of construction, arrangement, and combinations of parts as will be hereinafter fully described and pointed out in the claims, reference being had to the accompanying drawing, in which Figure 1 is a perspective view showing my improvement applied to the runner of a planter. Fig. 2 is a perspective view of the device detached. Fig. 3 is a top plan view.

My improved gage comprises two shoes, each consisting of horizontally disposed plates A, A, the inner edges of which are to rest against the side face of the runner or furrow opener R of the planter. The outer edges of the shoes near their forward end are curved or beveled inwardly and meet the inner edges in a point, said inner edges lying against the sides of the furrow opener, the forward beveled ends being bent upwardly at A' as plainly shown in Fig. 2. To the upper surface of the shoes are riveted the feet C C, of a spring steel arched yoke C', the legs of which extend upwardly on either side of the runner R. At a suitable point holes are drilled through the legs of the arched yoke in which holes is placed a screw bolt B and on the threaded end of said bolt is placed a winged nut D, by means of which the legs of the arched yoke may be drawn towards each other to clamp tightly the gage on the runner at any desired height. To remove the gage it is only necessary to loosen the winged nut D, so the legs of the arched yoke may be forced outwardly away from the side faces of the runner. The upturned forward ends prevent the gage shoes from plunging into the earth while the furrow is being opened.

It will be clearly seen that my improvement can be quickly and easily applied to or detached from the runner of any planter and that by means of the winged nut and the resiliency of the arched yoke the gage can be so set that the depth to which the furrow is to be opened can be regulated and thus prevent the too deep or too shallow planting of the seed.

By virtue of the resiliency of the arch of the yoke the arms thereof tend to always grip the sides of the runner of the planter with a frictional contact, the bolt B and the winged nut D constituting an additional securing means by virtue of which the runners A are firmly clamped in any desired place.

By use of my device no change is necessary to the planter runner, as all of the necessary clamping means are entirely independent of the planter. Hence my improvement can be sold as an independent article of manufacture to the users of any of the usual types of planters.

I claim:

1. As a new article of manufacture a gage for seed planter furrow openers comprising a resilient yoke carrying at its lower ends a pair of horizontally disposed shoes, adapted to engage frictionally the opposite sides of the furrow opener.

2. As a new article of manufacture a gage for furrow openers of seeders comprising a yoke consisting of two resilient members normally springing toward each other, a pair of horizontally disposed shoes at the lower ends of said resilient members, and auxiliary means for causing said resilient members to approach each other.

3. As a new article of manufacture a gage for furrow openers of seeders comprising an arched yoke member consisting of two resilient oppositely arranged spring arms connected at their upper ends, horizontally disposed shoes at the lower ends of said arms, a bolt passing through said arms, and a nut engaging said bolt, whereby the said resilient arms may be forced toward each other to rigidly clamp the same to the furrow opener of a seeder.

DENIS J. MAHONEY.

Witnesses:
D. CLINTON DYER,
GEORGE E. DYER.